US008817955B2

(12) United States Patent
Milstein et al.

(10) Patent No.: US 8,817,955 B2
(45) Date of Patent: Aug. 26, 2014

(54) PEER-TO-PEER BROADCASTING IN A VOIP SYSTEM

(75) Inventors: David Milstein, Redmond, WA (US); Linda Criddle, Kirkland, WA (US); Scott C Forbes, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1282 days.

(21) Appl. No.: 11/480,660

(22) Filed: Jun. 30, 2006

(65) Prior Publication Data

US 2008/0037723 A1 Feb. 14, 2008

(51) Int. Cl.
*H04M 1/64* (2006.01)
*H04L 12/66* (2006.01)

(52) U.S. Cl.
USPC .......................................... 379/88.12; 370/353

(58) Field of Classification Search
USPC ............... 379/93.01, 93.15, 88.14, 88.12; 370/352, 353, 354, 355, 356, 256
See application file for complete search history.

(56) References Cited

U.S. PATENT DOCUMENTS

| | | | |
|---|---|---|---|
| 5,956,681 A | 9/1999 | Yamakita | 704/260 |
| 6,069,940 A | 5/2000 | Carleton et al. | 379/88.04 |
| 6,097,288 A | 8/2000 | Koeppe, Jr. | |
| 6,249,765 B1 | 6/2001 | Adler et al. | 704/500 |
| 6,405,033 B1 | 6/2002 | Kennedy, III et al. | 455/414.1 |
| 6,418,216 B1 | 7/2002 | Harrison et al. | 379/208.01 |
| 6,442,250 B1 * | 8/2002 | Troen-Krasnow et al. | 379/93.15 |
| 6,608,559 B1 | 8/2003 | Lemelson et al. | |
| 6,678,357 B2 | 1/2004 | Stumer et al. | |
| 6,728,358 B2 | 4/2004 | Kwan | 379/202.01 |
| 6,771,742 B2 | 8/2004 | McCalmont et al. | |
| 6,868,143 B1 | 3/2005 | Menon et al. | 379/88.13 |
| 6,904,132 B2 | 6/2005 | Reynolds | |
| 6,925,487 B2 | 8/2005 | Kim | |
| 7,027,564 B2 | 4/2006 | James | |
| 7,046,986 B2 | 5/2006 | Amano et al. | |

(Continued)

FOREIGN PATENT DOCUMENTS

EP 1643740 A1 4/2006

OTHER PUBLICATIONS

Lookabaugh, T., et al., "A Model for Emergency Service of VoIP Through Certification and Labeling," *Federal Communications Law Journal* 58(1):115-167, 2006.

(Continued)

*Primary Examiner* — Fan Tsang
*Assistant Examiner* — Solomon Bezuayehu
(74) *Attorney, Agent, or Firm* — Andrew Smith; Micky Minhas

(57) ABSTRACT

A method and system provides the ability to use VoIP devices to generate and/or propagate a broadcast message to other devices. A device transmits a broadcast message to a recipient device over a peer-to-peer communication channel. Such a device can be an originator or a propagator designated by a third party. Upon receipt of a request to broadcast a message, or upon detecting any triggering event to broadcast, the device processes the request or the triggering event to compose content of the message. Subsequently, a group of recipient devices are identified and located. The device may transmit the broadcast message over existing communications channels without disturbing a conversation with the recipient device. Further, a peer-to-peer communication channel may be established to transmit the broadcast message. Alternatively, the device may request the recipient device to broadcast the message to devices outside of its current peer-to-peer communication connections.

20 Claims, 17 Drawing Sheets

(56) References Cited

U.S. PATENT DOCUMENTS

| | | | |
|---|---|---|---|
| 7,180,997 B2 | 2/2007 | Knappe | 379/387.01 |
| 7,251,313 B1 | 7/2007 | Miller et al. | 379/88.01 |
| 7,359,493 B1 | 4/2008 | Wang et al. | 379/88.23 |
| 7,469,041 B2* | 12/2008 | Cragun | 379/92.01 |
| 7,627,305 B2 | 12/2009 | Helferich | |
| 7,697,511 B2 | 4/2010 | Milstein et al. | 370/352 |
| 7,715,533 B2* | 5/2010 | Pradhan et al. | 379/88.22 |
| 8,280,015 B2 | 10/2012 | Milstein et al. | |
| 8,472,430 B2 | 6/2013 | Milstein et al. | |
| 8,483,368 B2 | 7/2013 | Milstein et al. | |
| 2002/0062310 A1* | 5/2002 | Marmor et al. | 707/3 |
| 2002/0110226 A1 | 8/2002 | Kovales et al. | 379/88.17 |
| 2002/0124057 A1 | 9/2002 | Besprosvan | 709/219 |
| 2002/0196910 A1 | 12/2002 | Horvath et al. | 379/88.01 |
| 2003/0143974 A1 | 7/2003 | Navarro | 455/404 |
| 2003/0162557 A1 | 8/2003 | Shida | 455/521 |
| 2004/0052218 A1 | 3/2004 | Knappe | |
| 2005/0003797 A1 | 1/2005 | Baldwin | 455/404.1 |
| 2005/0030977 A1 | 2/2005 | Casey et al. | |
| 2005/0037739 A1 | 2/2005 | Zhong | |
| 2005/0062844 A1 | 3/2005 | Ferren et al. | 348/14.08 |
| 2005/0090225 A1 | 4/2005 | Muehleisen et al. | |
| 2005/0162267 A1 | 7/2005 | Khandelwal et al. | 340/506 |
| 2005/0164681 A1 | 7/2005 | Jenkins et al. | 455/412.1 |
| 2005/0176451 A1 | 8/2005 | Helferich | |
| 2005/0198143 A1 | 9/2005 | Moody et al. | 709/206 |
| 2005/0213565 A1 | 9/2005 | Barclay et al. | |
| 2005/0213716 A1 | 9/2005 | Zhu et al. | |
| 2005/0281284 A1 | 12/2005 | Shim et al. | |
| 2006/0018305 A1 | 1/2006 | Cope | 370/352 |
| 2006/0059495 A1* | 3/2006 | Spector | 719/310 |
| 2006/0067308 A1 | 3/2006 | Cho | |
| 2006/0072547 A1 | 4/2006 | Florkey et al. | |
| 2006/0126599 A1* | 6/2006 | Tarn | 370/352 |
| 2006/0229093 A1 | 10/2006 | Bhutiani et al. | 455/518 |
| 2007/0115923 A1 | 5/2007 | Denny et al. | 370/352 |
| 2007/0127633 A1* | 6/2007 | Hertel et al. | 379/67.1 |
| 2007/0195735 A1 | 8/2007 | Rosen et al. | 370/335 |
| 2007/0201376 A1 | 8/2007 | Marshall-Wilson | 370/252 |
| 2007/0230443 A1 | 10/2007 | Milstein et al. | 370/352 |
| 2007/0237130 A1 | 10/2007 | Milstein et al. | 370/352 |
| 2007/0237138 A1 | 10/2007 | Milstein et al. | 370/389 |
| 2007/0280433 A1 | 12/2007 | Milstein et al. | 379/67.1 |
| 2008/0003941 A1 | 1/2008 | Milstein et al. | 455/3.01 |
| 2008/0069006 A1 | 3/2008 | Walter et al. | 370/252 |
| 2008/0147854 A1* | 6/2008 | Van Datta et al. | 709/224 |
| 2008/0172463 A1* | 7/2008 | Qin et al. | 709/204 |
| 2009/0100009 A1* | 4/2009 | Karp | 707/3 |
| 2009/0180596 A1* | 7/2009 | Reynolds et al. | 379/48 |
| 2013/0003948 A1 | 1/2013 | Milstein et al. | |

OTHER PUBLICATIONS

Mintz-Habib, M., et al., "A VoIP Emergency Services Architecture and Protype," *Proceedings of the IEEE In't Conference on Computer Communications and Networks,* San Diego, Calif., Oct. 17-19, 2005, pp. 523-528.

*TCN Users' Manual* [online], uploaded on Oct. 5, 2004 <http://www.scmaonline.net/test/Linnie%20Files/Users'%20Manual.TCN.doc> [retrieved Apr. 18, 2006].

Office Action mailed Sep. 15, 2010, in U.S. Appl. No. 11/480,752.
Office Action mailed Apr. 4, 2008, in U.S. Appl. No. 11/398,966.
Office Action mailed Nov. 13, 2008, in U.S. Appl. No. 11/398,966.
Office Action mailed Jan. 21, 2010, in U.S. Appl. No. 11/444,633.
Office Action mailed Jul. 2, 2010, in U.S. Appl. No. 11/444,633.
Office Action mailed Jul. 21, 2010, in U.S. Appl. No. 11/397,475.
Office Action mailed Mar. 28, 2012, in U.S. Appl. No. 11/480,752.
Office Action mailed Apr. 23, 2012, in U.S. Appl. No. 11/444,633.
Office Action mailed May 16, 2001, in U.S. Appl. No. 11/398,816.
U.S. Appl. No. 13/601,791 entitled "Providing Contextual Information With a Voicemail Message" filed Aug. 31, 2012.
Office Action mailed Oct. 11, 2012, in U.S. Appl. No. 11/480,752.
Office Action mailed Nov. 28, 2012, in U.S. Appl. No. 13/601,791.
Office Action mailed Feb. 2, 2011, in U.S. Appl. No. 11/397,475.
Office Action mailed Feb. 18, 2011, in U.S. Appl. No. 11/480,752.
Office Action mailed Sep. 28, 2011, in U.S. Appl. No. 11/398,816.
Office Action mailed Oct. 12, 2011, in U.S. Appl. No. 11/480,752.
Office Action mailed Feb. 6, 2012, in U.S. Appl. No. 11/398,816.
Office Action mailed Apr. 22, 2013, in U.S. Appl. No. 11/480,752.

\* cited by examiner

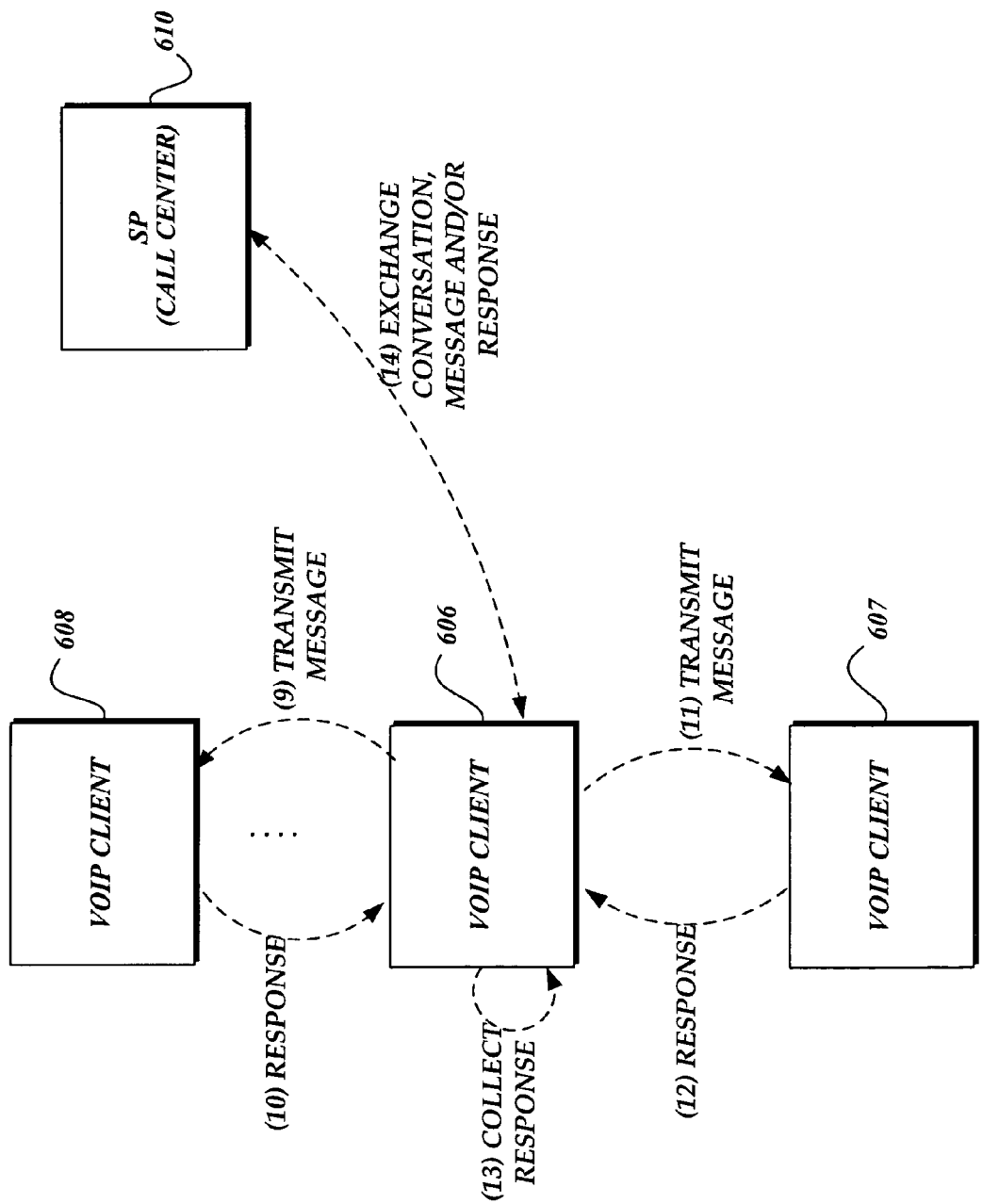

PEER-TO-PEER BROADCASTING IN A VOIP SYSTEM

BACKGROUND

Generally described, an Internet telephony system provides an opportunity for users to have a call connection with enhanced calling features compared to a conventional Public Switched Telephone Network (PSTN) based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, the current VoIP approach does not encompass a method or a system to provide the ability to use VoIP devices to forward a broadcast message to other devices while the devices are exchanging VoIP communications.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, a method and system provides the ability to use VoIP devices to generate and/or propagate a broadcast message to other devices. A device transmits a broadcast message to a recipient device over a peer-to-peer communication channel. Such a device can be an originator or a propagator designated by a third party. Upon receipt of a request to broadcast a message, or upon detecting any triggering event to broadcast, the device processes the request or the triggering event to compose content of the message. Subsequently, a group of recipient devices are identified and located. The device may transmit the broadcast message over existing communications channels without disturbing a conversation with the recipient device.

In accordance with an aspect of the present invention, a method for broadcasting a message from a device to recipient devices over a digital voice communication channel is provided. The method may include composing content of a broadcast message, and identifying a first group of recipient devices based on the content where the recipient devices are connected according to a peer-to-peer protocol. At least one broadcast message may be formatted in accordance with profile information of each recipient device from the first group and then transmitted to each corresponding recipient device. In return, a response to the transmitted broadcast message may be received. New broadcast messages may be formatted and transmitted in response to a received response from recipient devices. In addition, the device identifies other recipient devices which are not currently connected. A communication channel may be established for transmitting a broadcast message. Alternatively, the device may advertise the currently connected devices to transmit the message to the identified recipient devices.

In accordance with another aspect of the present invention, a method is described for permitting a sending device to transmit a message over an existing peer-to-peer communication channel without interrupting a digital voice conversation. A broadcast device may receive a message from the sending device and process the message. If the sending device provides desirable recipient device information via a set of rules, preferences, or a list of recipient devices, the broadcast device may identify and send the message to a group of recipient devices accordingly. If the sending device does not provide desirable recipient device information, the broadcast device may send the message out to any device currently in communication.

In accordance with yet another aspect of the present invention, a computer-readable medium having computer-executable components for peer-to-peer broadcasting is provided. The computer-readable medium includes a processing component, a generating component, and a broadcasting component. The processing component is configured to detect a request to broadcast and identify a recipient device. The generating component is configured to format a broadcast message suitable for the recipient device. The formatted message is broadcasted to the recipient device over a digital voice conversation according to a peer-to-peer protocol.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A-7C are block diagrams illustrating interactions between VoIP entities for propagating a message over a peer-to-peer communication channel;

DETAILED DESCRIPTION

Generally described, the present invention relates to a method and system for providing VoIP devices capable of generating and/or propagating a broadcast message to other devices. More specifically, the present invention relates to a method and system for propagating a message over a peer-to-peer communication channel without disturbing a current VoIP conversation. A VoIP conversation is a data stream of information related to a conversation, such as contextual information and voice information, exchanged over a communication channel. For example, the messages and the corresponding responses are exchanged as part of contextual information represented according to "structured hierarchies" in a peer-to-peer communication channel. "Structured hierarchies," as used herein, are predefined organizational structures for arranging contextual information to be exchanged between two or more VoIP devices. For example, structured hierarchies may be XML namespaces. Although the present invention will be described with relation to the illustrative structured hierarchies and an IP telephony environment, one skilled in the relevant art will appreciate that the disclosed embodiments are illustrative in nature and should not be construed as limiting.

Figure 1:
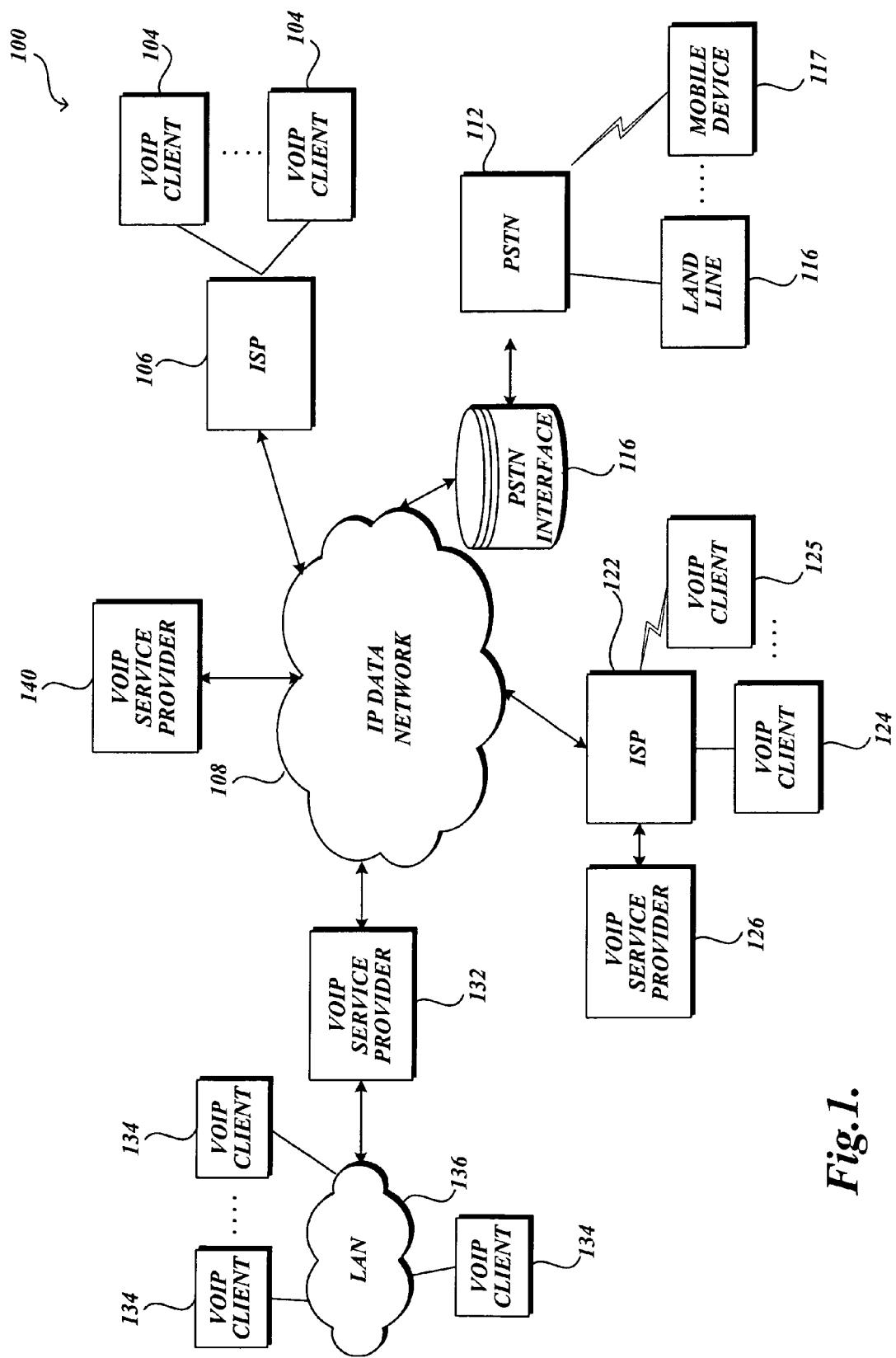
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices, and has a unique VoIP client identifier. For example, a single individual, five associated VoIP devices, and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 134 may collect, maintain, and provide contextual information relating to a request signal for a communication channel. In addition, the VoIP service providers 126, 132, 140 may be any VoIP related service providers, including a call center, a customer support center, a VoIP service provider, an interactive E-commerce server, a centralized client information management server, and the like. The VoIP service providers 126, 132, 140 also collect, maintain, and provide a separated set of information (e.g., provider contextual information) for providing services (requested, self-configured) for VoIP clients 104, 124, 125, 134 communicating in a call conversation. The VoIP service providers 126, 132, 140 may route a request signal for a communication channel to an appropriate destination and contextual information which may assist the appropriate destination in providing the requested service.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to an Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with the PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116, may request a connection with the VoIP client based on the unique VoIP identifier of that client, and the appropriate VoIP device associated with the VoIP client will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without a VoIP service provider 132 or an ISP 106, 122. Further, an ISP 106, 122 can also provide VoIP services to its client.

Figure 2:
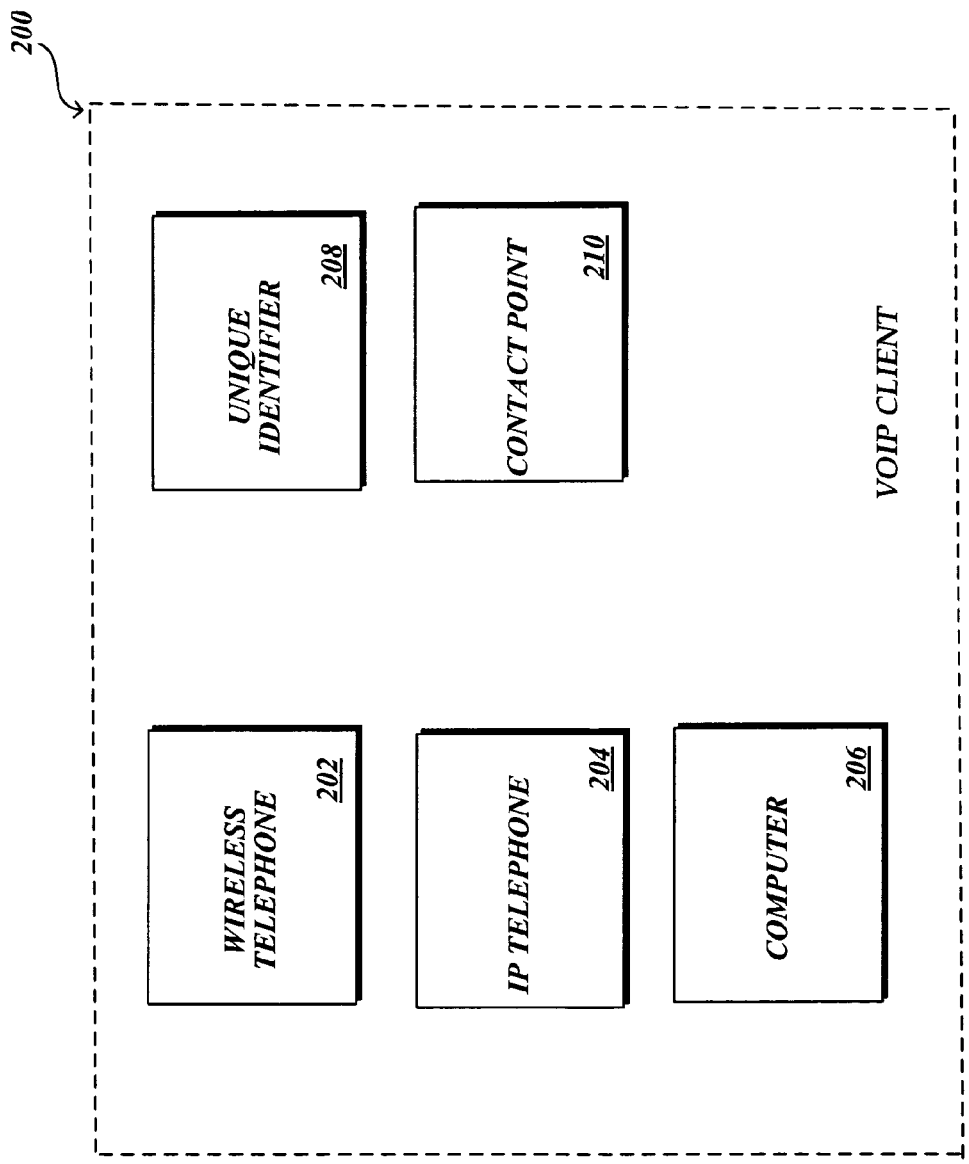
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained, for example, by a service provider, may be associated with the VoIP client and accessible by each VoIP device that contains information relating to the VoIP client. In one embodiment, any suitable VoIP device such as a wireless phone 202, an IP phone 204, or a computer 206 with proper VoIP applications may be part of the VoIP client 200. The VoIP client 200 also maintains one or more unique client identifiers 208. The unique client identifier(s) 208 may be constant or change over time. For example, the unique client identifier(s) 208 may change with each call. The unique client identifier is used to identify the client and to connect with the contact point 210 associated with the VoIP client. The unique client identifier may be maintained on each VoIP device included in the VoIP client and/or maintained by a service provider that includes an association with each VoIP device included in the VoIP client. In the instance in which the unique client identifier is maintained by a service provider, the service provider may include information about each associated VoIP device and knowledge as to which device(s) to connect to for incoming communications. In an alternative embodiment, the VoIP client 200 may maintain multiple VoIP identifiers. In this embodiment, a unique client identifier may be temporarily assigned to the VoIP client 200 for each call session.

The unique client identifier may be used similarly to a telephone number in PSTN. However, instead of dialing a typical telephone number to ring a specific PSTN device, such as a home phone, the unique client identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
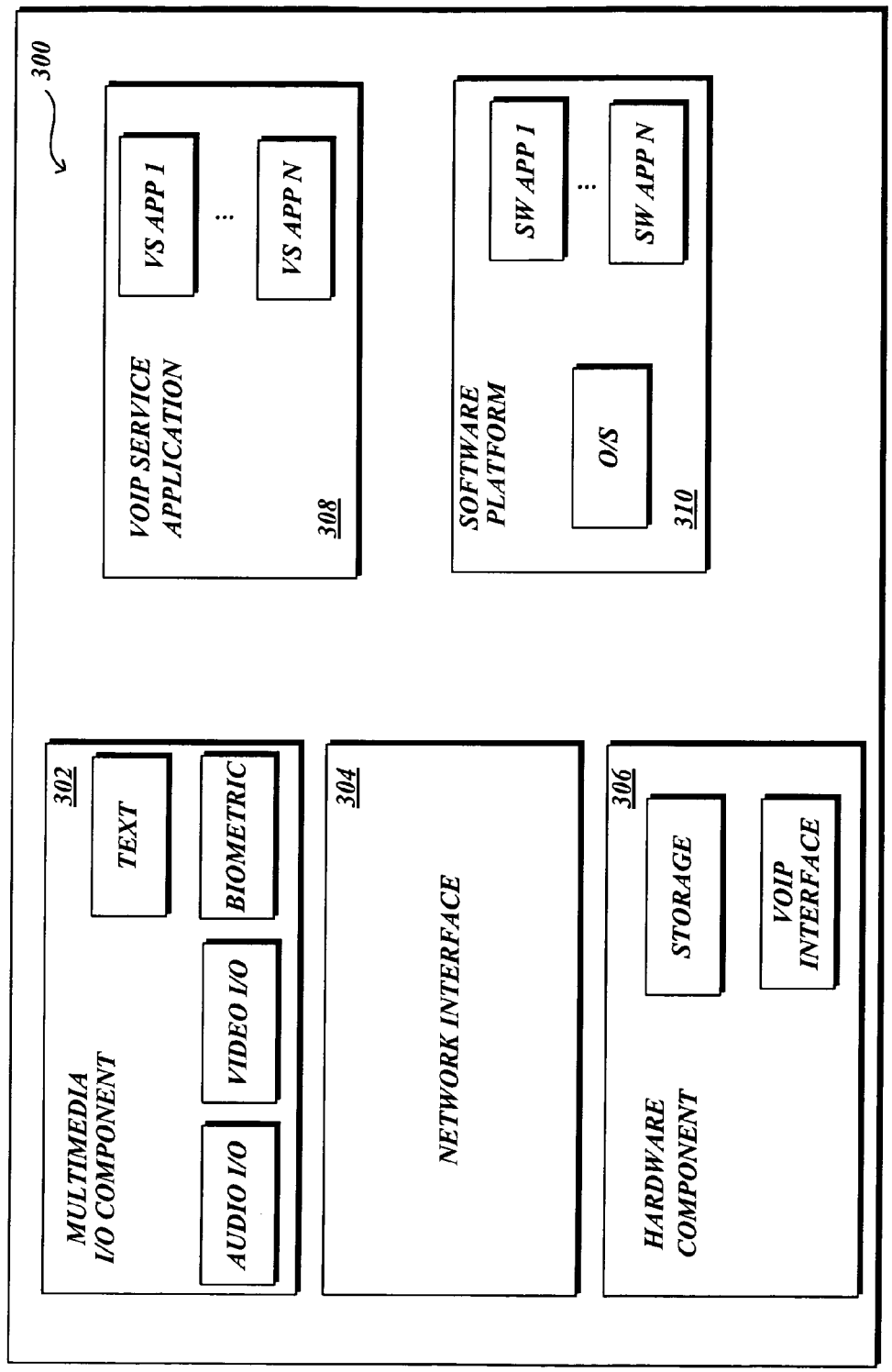
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting, and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc.

The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequencies (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications, and to store contextual information related to individuals (e.g., voice profiles, user biometrics information, etc.) associated with the VoIP client in which the device is included. In one embodiment, the hardware component 306 may include a VoIP interface card which allows a non-VoIP client device to transmit and receive a VoIP conversation.

The device 300 may further include a software platform component 310 for the operation of the device 300 and a VoIP service application component 308 for supporting various VoIP services. The VoIP service application component 308 may include applications such as data packet assembler/disassembler applications, a structured hierarchy parsing application, audio Coder/Decoder (CODEC), video CODEC, and other suitable applications for providing VoIP services. The CODEC may use voice profiles to filter and improve incoming audio.

Figure 4:
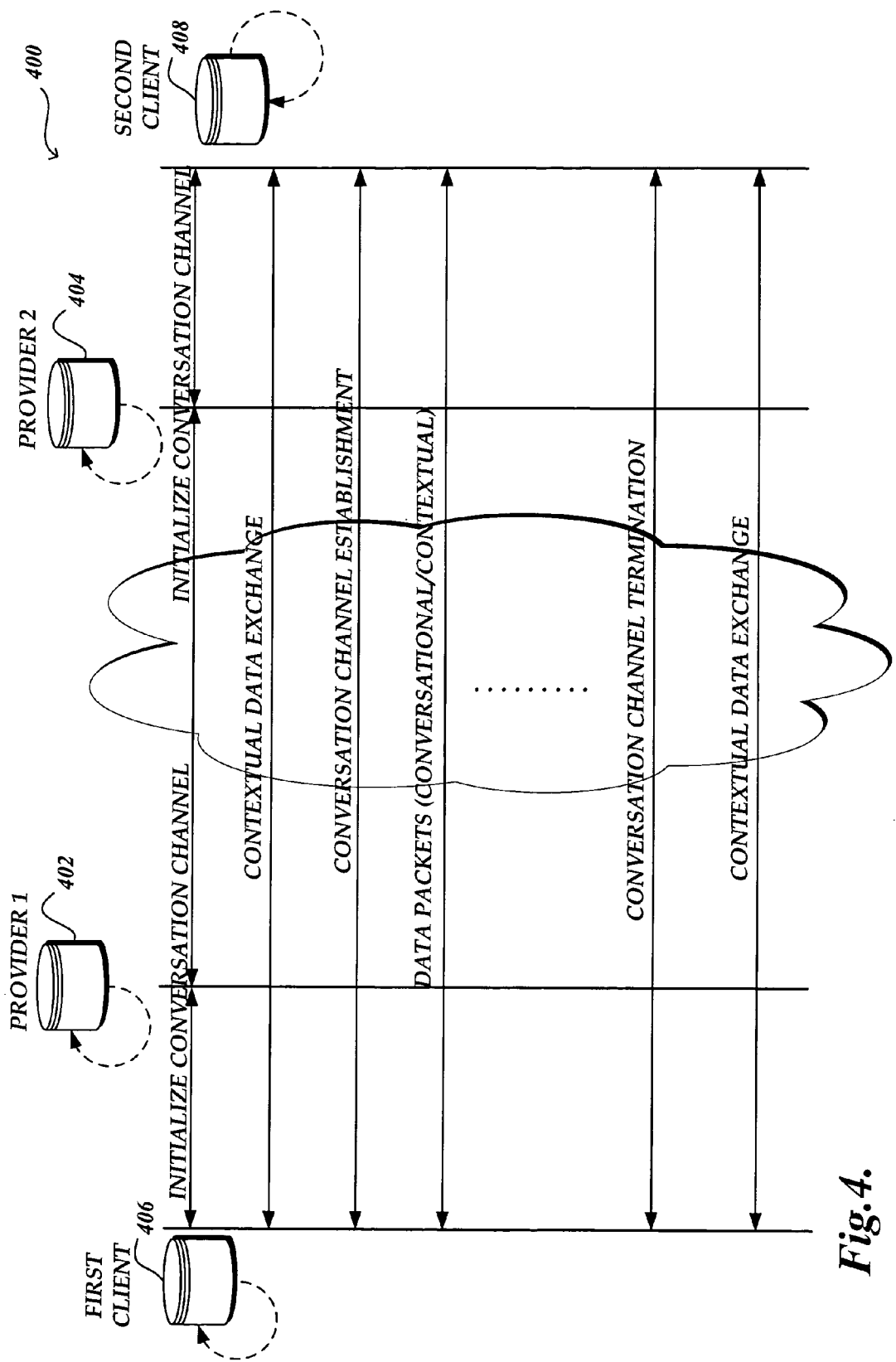
FIG. 4 is a block diagram illustrative of the exchange of data between two VoIP clients over a conversation channel in accordance with an aspect of the present invention.

With reference to FIG. 4, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over a Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, consider an example in which the first VoIP client 406 and the second VoIP client 408 each include only one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called.

Available media types, rules of the calling client and/or the client being called, and the like, may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel, or execute other appropriate actions, such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 5:
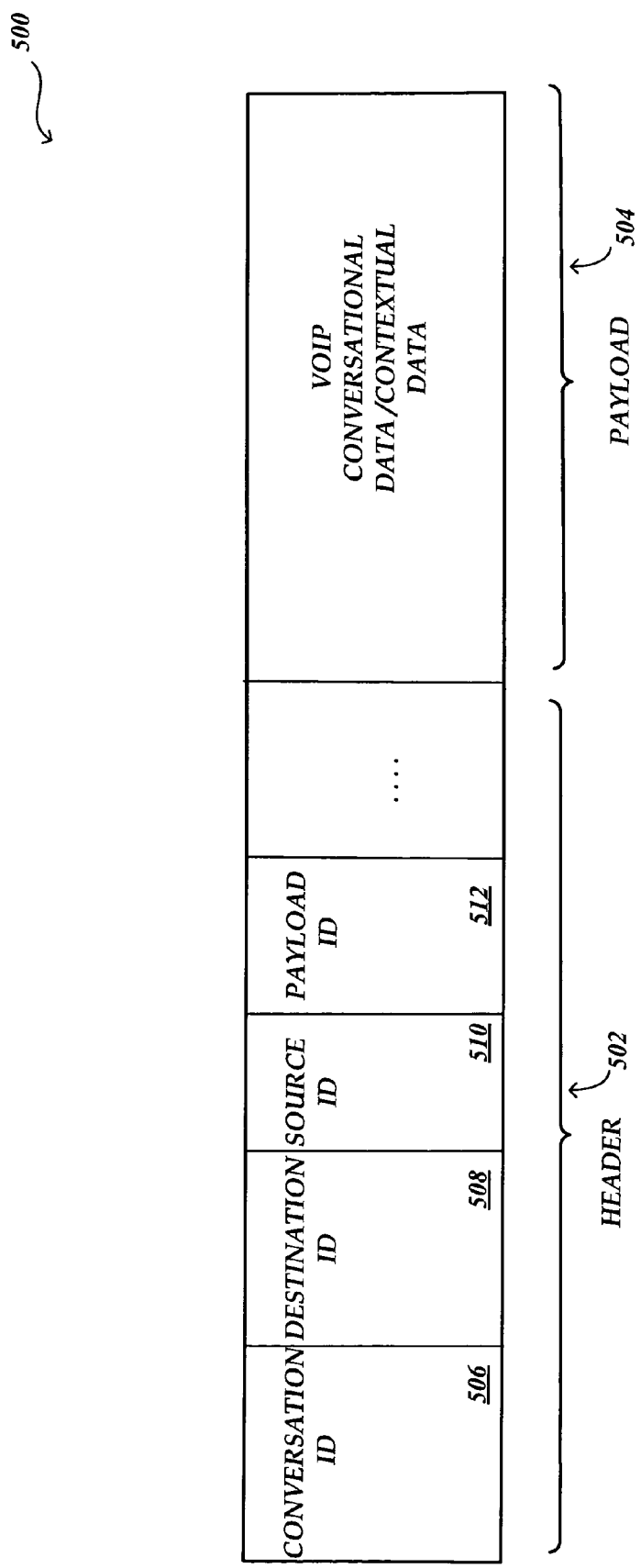
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain the information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the client's confidential information, VoIP device's functionality, VoIP service provider's information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, the client's confidential information will be deleted by the VoIP service provider associated with that client unless the client authorizes such information to be transmitted. In some cases, a minimal amount of contextual information is transmitted outside of an intranet network.

Figure 6:
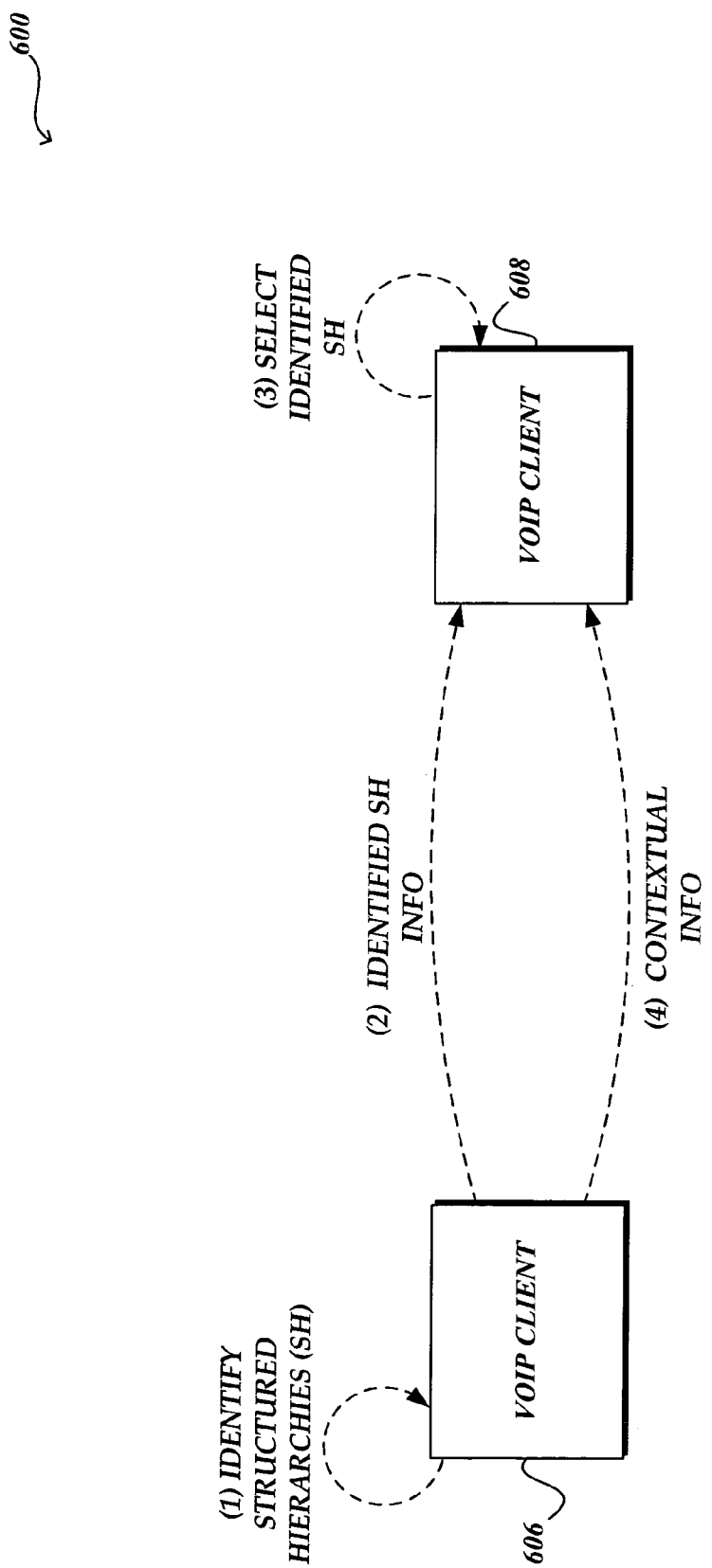
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIG. 4, the example described herein will utilize the scenario in which each client only has one device associated therewith and the connection occurs between those two devices. In one embodiment, devices of VoIP Client 606 and VoIP Client 608 have established a VoIP conversation channel. The structured hierarchies to be used to carry certain contextual information may be identified by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information identifying which structured hierarchy will be used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing predefined structured hierarchies, data packets can be transmitted in a manner which is independent of hardware and/or software.

Upon retrieving the identified structured hierarchy, VoIP Client 608 is expecting to receive a data stream in which data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7A:
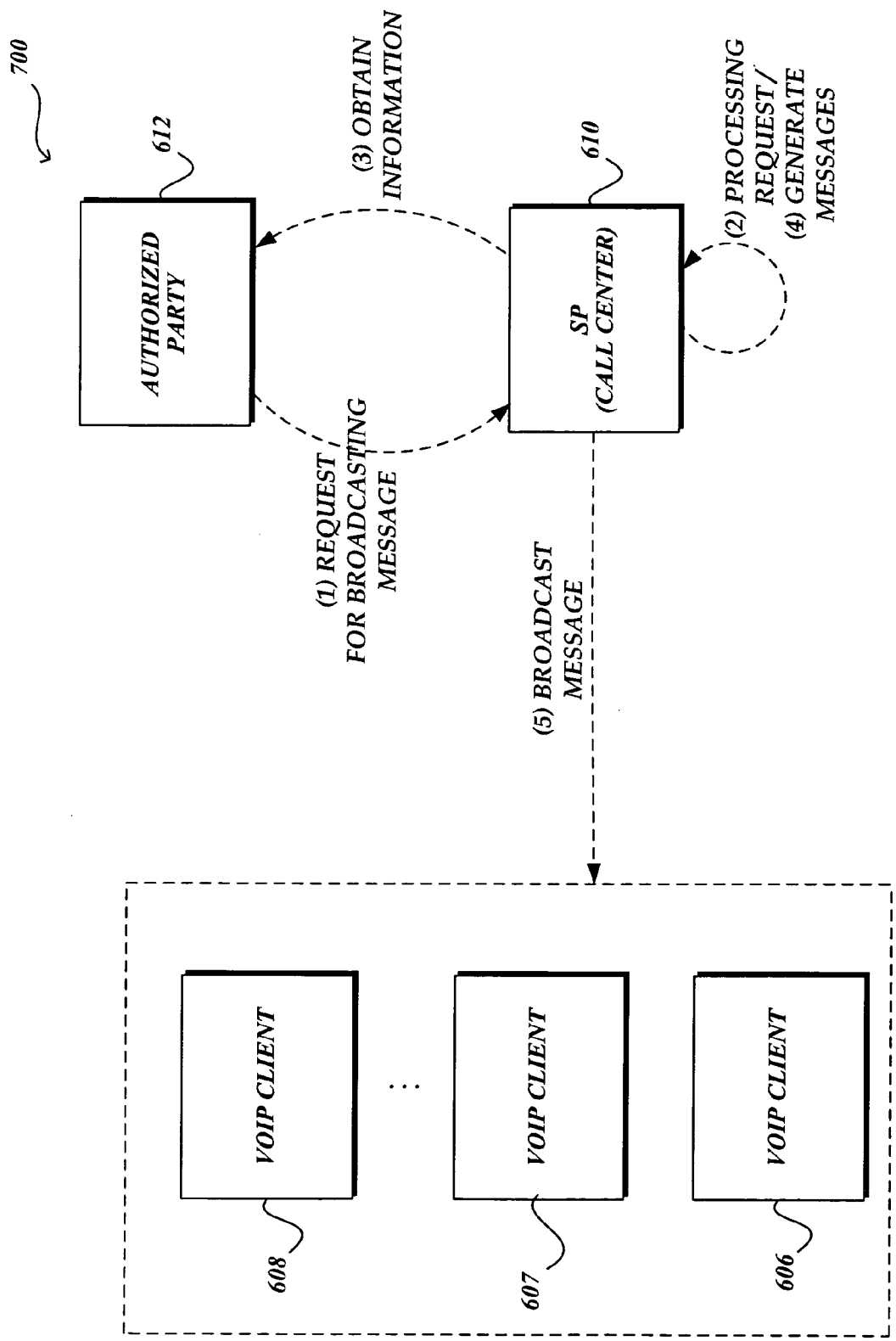
Figure 7B:
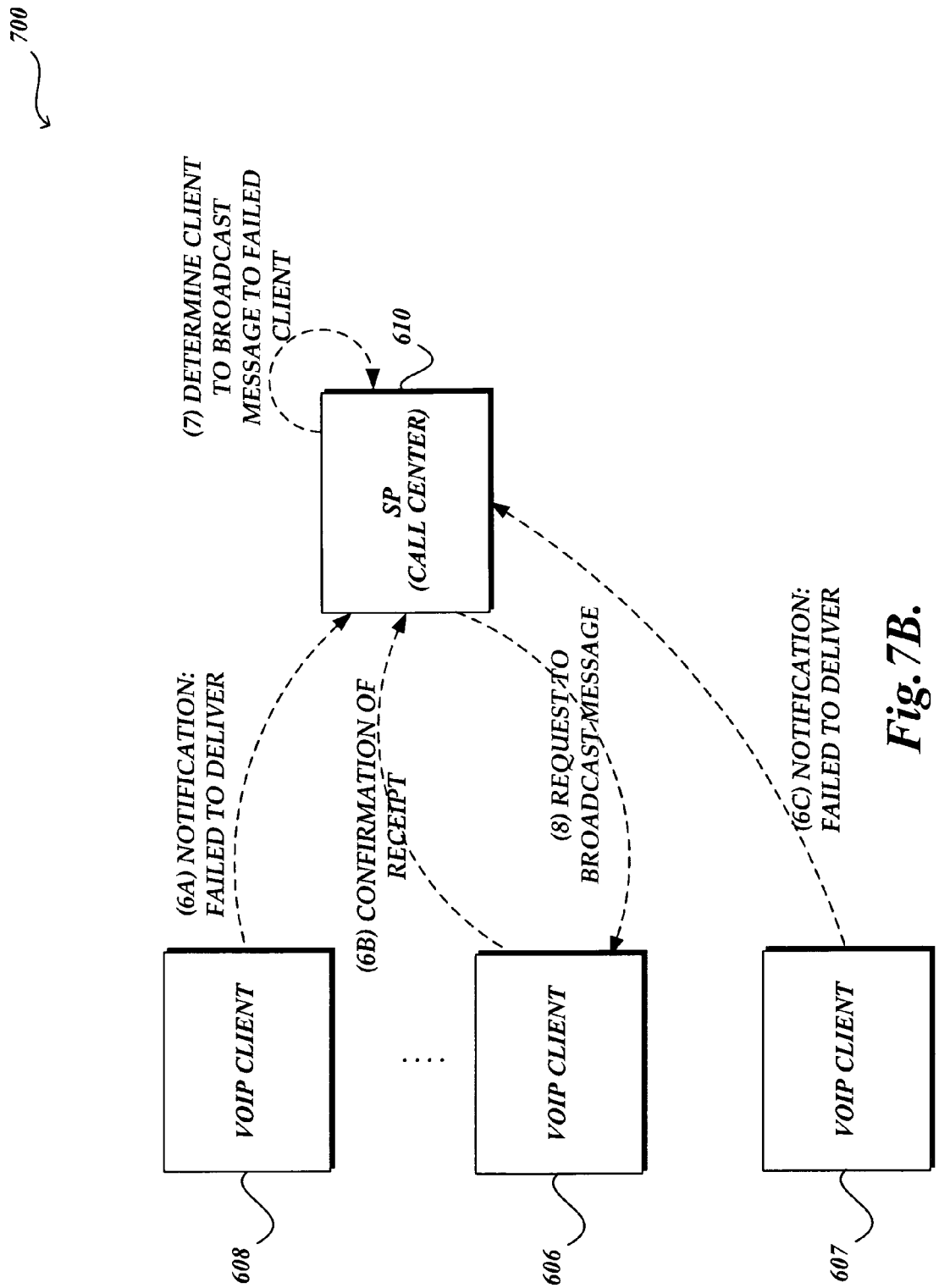

FIGS. 7A-7C are block diagrams 700 illustrating peer-to-peer broadcasting among VoIP entities in accordance with an embodiment of the present invention. In one embodiment, the VoIP entities may include VoIP clients, VoIP service providers for the clients, third party service providers, and the like. For discussion purposes, assume that a call center is in charge of broadcasting emergency messages to its clients in one geographic area. The call center can create an emergency message upon detection of an emergency such as a cable line down due to hurricane. Likewise, the call center can formulate an emergency message upon receipt of a request from emergency broadcast organizations (e.g., fire station, Federal Emergency Management Agency, etc.) to broadcast a particular emergency message. In one embodiment, the emergency broadcast organizations have been pre-authorized to broadcast such emergency message. The call center and the emergency broadcast organizations may have a prearranged agreement how to determine the scope of recipient clients, priority of clients, priority of messages, etc.

With reference to FIG. 7A, in one embodiment, an authorized party 612 may send a request for broadcasting a message to a Service Provider (SP) 610. SP 610 may be a service provider on premises (e.g., part of a client if the client is a corporation) or a service provider off premises (an external service provider). As will be described in greater detail below, SP 610 may be any VoIP related service provider, including a call center, a VoIP service provider, and the like. SP 610 may process the request and send a response to obtain necessary information from the authorized party 612. For example, SP 610 may need to have more information regarding which group of clients should be notified first, with what level of detail, for how long, etc. SP 610 generates a broadcast message based on the obtained information. Subsequently, SP 610 transmits the broadcast message to its clients (e.g., VoIP Client 606, VoIP Client 607, VoIP Client 608, etc.). In one embodiment, several broadcast messages may be generated for a client and stored in a queue based on a schedule.

For discussion purposes, assume that a city emergency center contacts a call center for an emergency broadcasting about a flood in a river. Upon receipt of the request, the call center composes the content of a message (e.g., flood warning content). The call center may need additional information, for example, client profile information, a set of rules indicating which group of clients should be notified first, with what level of detail, etc. The call center may obtain such necessary information from the city emergency center. Based on this information, the call center may identify several groups of clients who should receive the flood warning message. A first group of clients may be clients traveling or residing near the flooded area. A second group of clients may be clients who can be influenced by the flood within an hour, and so on. In one embodiment, the call center generates a broadcast message which is formulated for each group and/or each client. Specifically, each client may have a limited number of devices currently available for receiving a broadcast message. In one embodiment, a broadcast message may be formulated based on the functionality of at least one available device of each client. For example, Bob, a client of the call center, forgot to bring his mobile phone but has a laptop with him. The call center may formulate and send a broadcast message to Bob's laptop. Upon receipt of the message, Bob tries to contact the call center to ask a safe direction which will lead away from the flood. The call center may route Bob to a contact of the call center (e.g., agent, Interactive Voice Response System (IVRS), operator, etc.), a third party service provider, or a public help center which is ready to provide further assistance.

Referring to FIG. 7B, VoIP clients (VoIP Client 606, VoIP Client 607, and VoIP Client 608) may respond to the broadcast message by sending a confirmation of receipt, sending a failure of receipt, sending a request to communicate, etc. In one embodiment, some clients (VoIP Client 607 and VoIP Client 608) cannot be reached by SP 610 but can be reached by a certain client (VoIP Client 606). In this embodiment, SP 610 may identify VoIP Client 606 as able to broadcast a message to the failed clients, and designate a device of VoIP Client 606 to propagate the received messages to the failed clients. SP 610 may send a request to broadcast messages in conjunction with a list of recipient clients, set of rules, preferences, etc.

Referring to FIG. 7C, a device of VoIP Client 606 propagates the received broadcast message to VoIP Client 607 and VoIP Client 608 which have not received the broadcast message from SP 610. For the purpose of discussion, VoIP Client 606, VoIP Client 607, and VoIP Client 608 have existing peer-to-peer communication channels. Upon receipt of the broadcast message, VoIP Client 607 and VoIP Client 608 send a response to VoIP Client 606. Subsequently, VoIP Client 606 sends the responses received from VoIP Client 607 and VoIP Client 608 to SP 610, if necessary. In one embodiment, VoIP Client 606 may be operating like a super node in a peer-to-peer network. SP 610 and other emergency broadcast organizations may send messages to VoIP Client 606 which can reach a particular group of clients. VoIP Client 606 may store the messages in local storage and broadcast the messages periodically to the group of clients. In some instances, in its response, clients may wish to communicate with a third party. Returning back to the flood emergency example, Bob may wish to contact a hospital for help with providing CPR to his friend while the client is communicating with the call center. The call center may route the communication channel connection to a hospital and eventually Bob and the hospital will have an established communication channel. In some cases, the call center, the hospital, and Bob may be connected via a multiparty communication channel.

Referring back to FIG. 7C, VoIP Client 606 has sent a request to have a two-way communication with SP 610. For example, VoIP Client 606 and a contact of SP 610 may begin exchanging a conversation which includes voice information, media information, and contextual information. In one embodiment, VoIP Client 607 can communicate with SP 610 via the VoIP Client 606.

In one embodiment, VoIP Client 606 may obtain contextual information including a list of recipient clients to broadcast, preferences, etc., from SP 610 or other emergency broadcast organizations which have requested to broadcast messages. Alternatively, VoIP Client 606 may previously have the priority information corresponding to other clients. As will be described in greater detail below, it is contemplated that structured hierarchies are utilized to carry contextual information (contextual data packets) between several VoIP entities in this illustrative embodiment. VoIP Client 606 processes the contextual information to identify what information will be further collected and which appropriate source will be contacted, or queried, to obtain the identified information. However, the initial contextual information may be sufficient enough for VoIP Client 606 to broadcast messages. In some instances, several message broadcasts to clients may be necessary. With each broadcast, the size or scope of the recipient clients and/or content of the messages may vary. The SP 610 may provide contextual information including a set of rules which specifies how to format, schedule, and transmit messages to clients. For example, a flood warning message may be read in Spanish for end users who have specified Spanish language preferences. Alternatively, a flood warning message for a first device of a client may be formatted to be a combination of an audible alarm and a text message while a flood message for a second device of the client may be formatted to be a voice recording.

Further, VoIP Client 606 requests the identified information and obtains the information from a third party SP. VoIP Client 606 and the third party SP may exchange more information, including the client's contextual information relating to the VoIP Client 607 and VoIP Client 608. In an illustrative embodiment, upon receipt of the request, VoIP Client 606 obtains (or collects) any readily available contextual information, for example, previously obtained contextual information related to VoIP Client 607 and VoIP Client 608 from existing peer-to-peer communication channels and previous communications from its database.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, XML namespace is provided to give the namespace a unique name. In some instances, the namespace may be used as a pointer to a centralized location containing default information about the namespace.

In accordance with an illustrative embodiment, while the communication channel is being established, VoIP Client 606 may identify a XML namespace for contextual information. For example, the XML namespace attribute may be placed in the start tag of a sending element. It is to be understood that XML namespaces, attributes, and classes illustrated herein are provided merely as an example of structured hierarchies used in conjunction with various embodiments of the present invention. After SP 610 receives the XML namespace information, the VoIP Client 606 transmits a set of contextual data packets, defined in accordance with the identified XML namespace, to SP 610. When a namespace is defined in the start tag of an element, all child elements with the same prefix are associated with the same namespace. As such, SP 610 and VoIP Client 606 can transmit contextual information without including prefixes in all the child elements, thereby reducing the amount of data packets transmitted for the contextual information. Likewise, VoIP Client 608 and VoIP Client 606 exchange the XML namespace information and a set of contextual data packets, defined in accordance with the identified XML namespace.

With reference to FIGS. 8A-8E, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass that corresponds to a subset of VoIP contextual information. For example, a VoIP namespace 800 may be defined as a hierarchically structured tree comprising a call basics class 802, a call contexts class 810, a device type class 820, a VoIP client class 830, and the like.

Figure 8A:
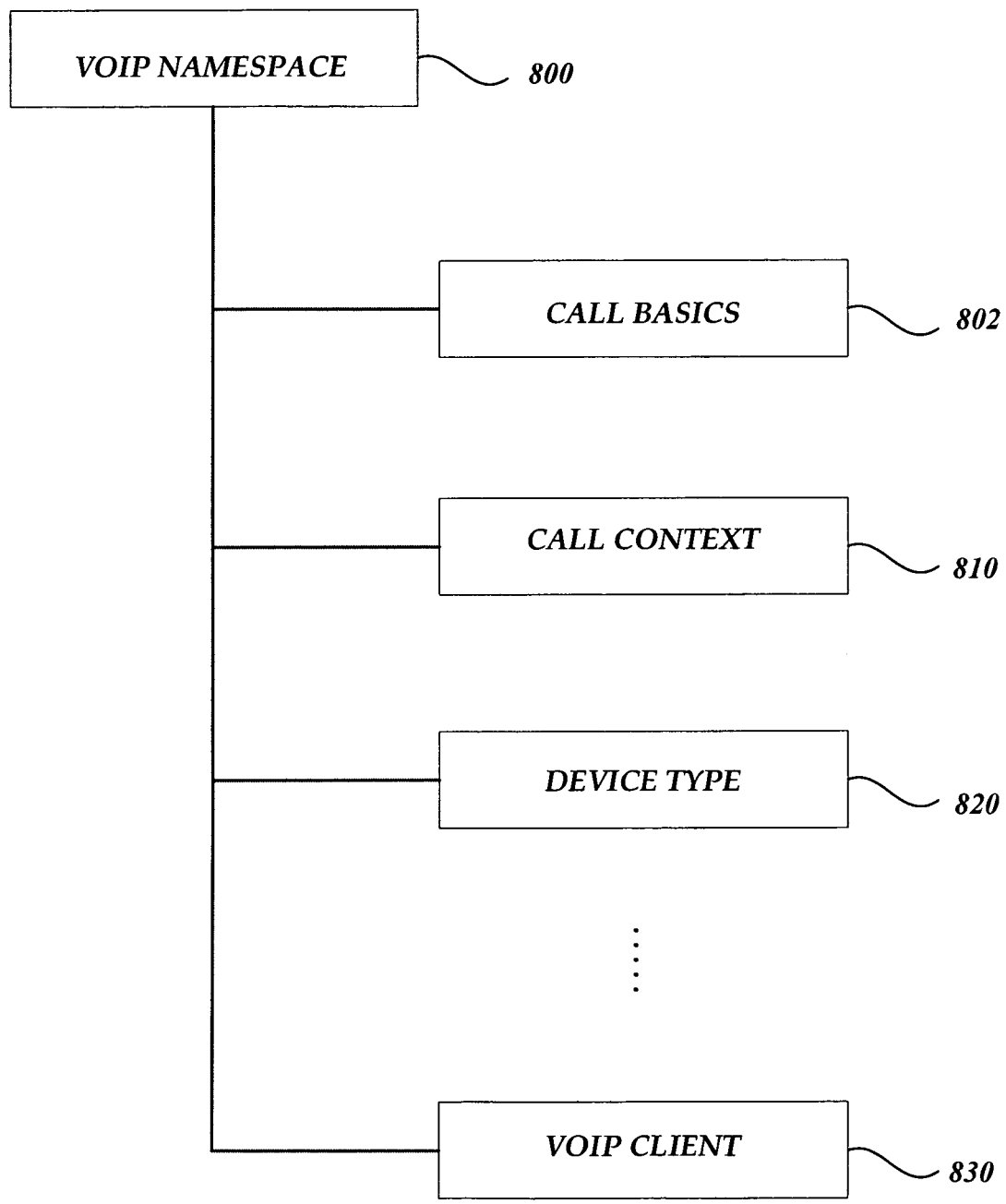
FIGS. 8A-8E are block diagrams illustrative of various attributes and classes of structured hierarchies corresponding to VoIP contextual information in accordance with an aspect of the present invention.
Figure 8B:
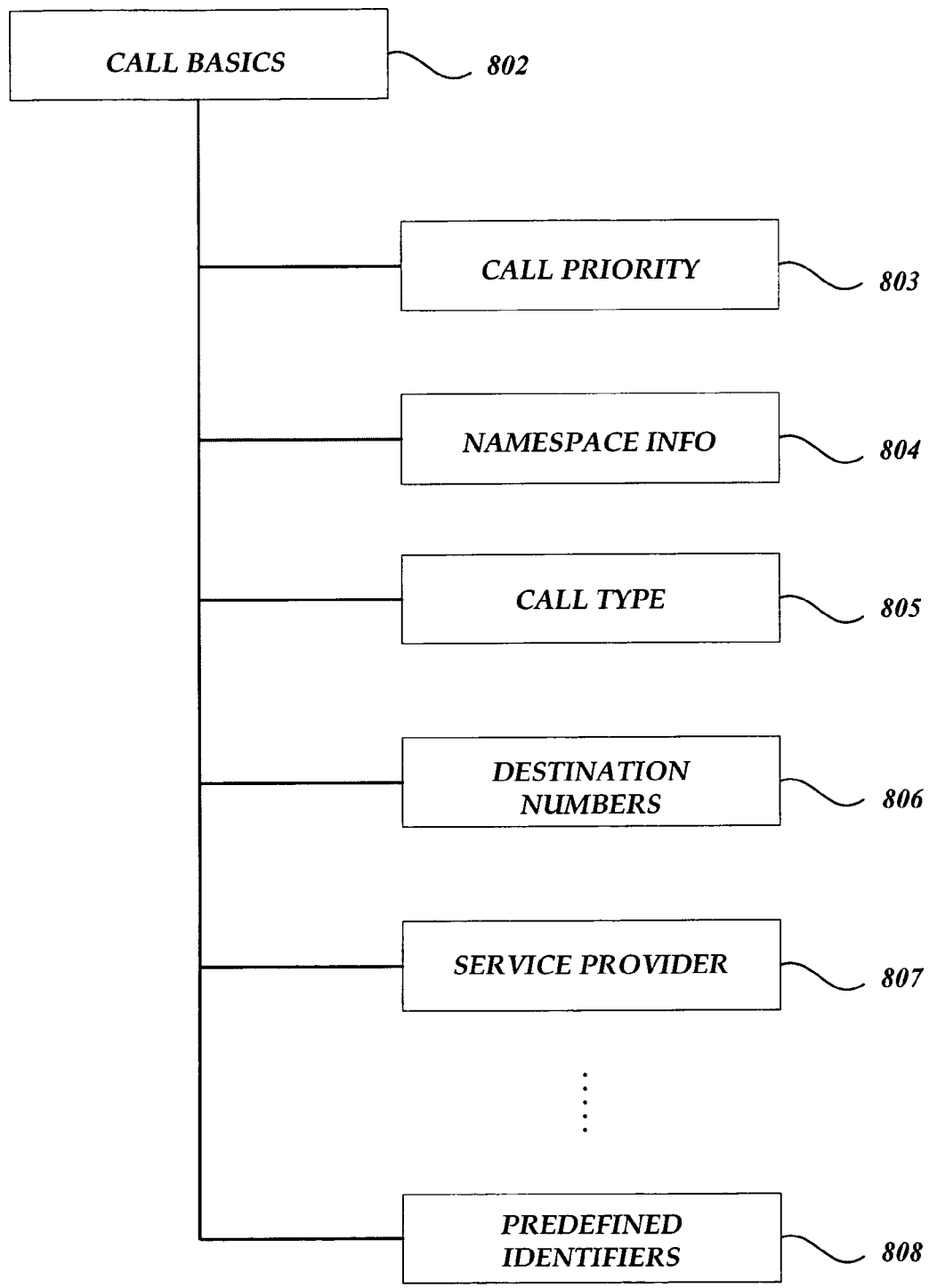

With reference to FIG. 8B, a block diagram of a call basics class 802 is shown. In an illustrative embodiment, the call basics class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers, or telephone numbers), call connection time, VoIP service provider related information, and/or ISP related information, such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer-to-computer communication, a computer to POTS device communication, and so forth. In one embodiment, the contextual information relating to a conversation channel connection may include predefined identifiers which represent emotions, sounds (e.g., "ah," "oops," "wow," etc.), and facial expressions in graphical symbols. In one embodiment, a call basics class 802 may be defined as a subtree structure of a VoIP namespace 800, which includes nodes such as call priority 803, namespace information 804, call type 805, destination numbers 806, service provider 807, predefined identifiers 808, and the like.

Figure 8C:
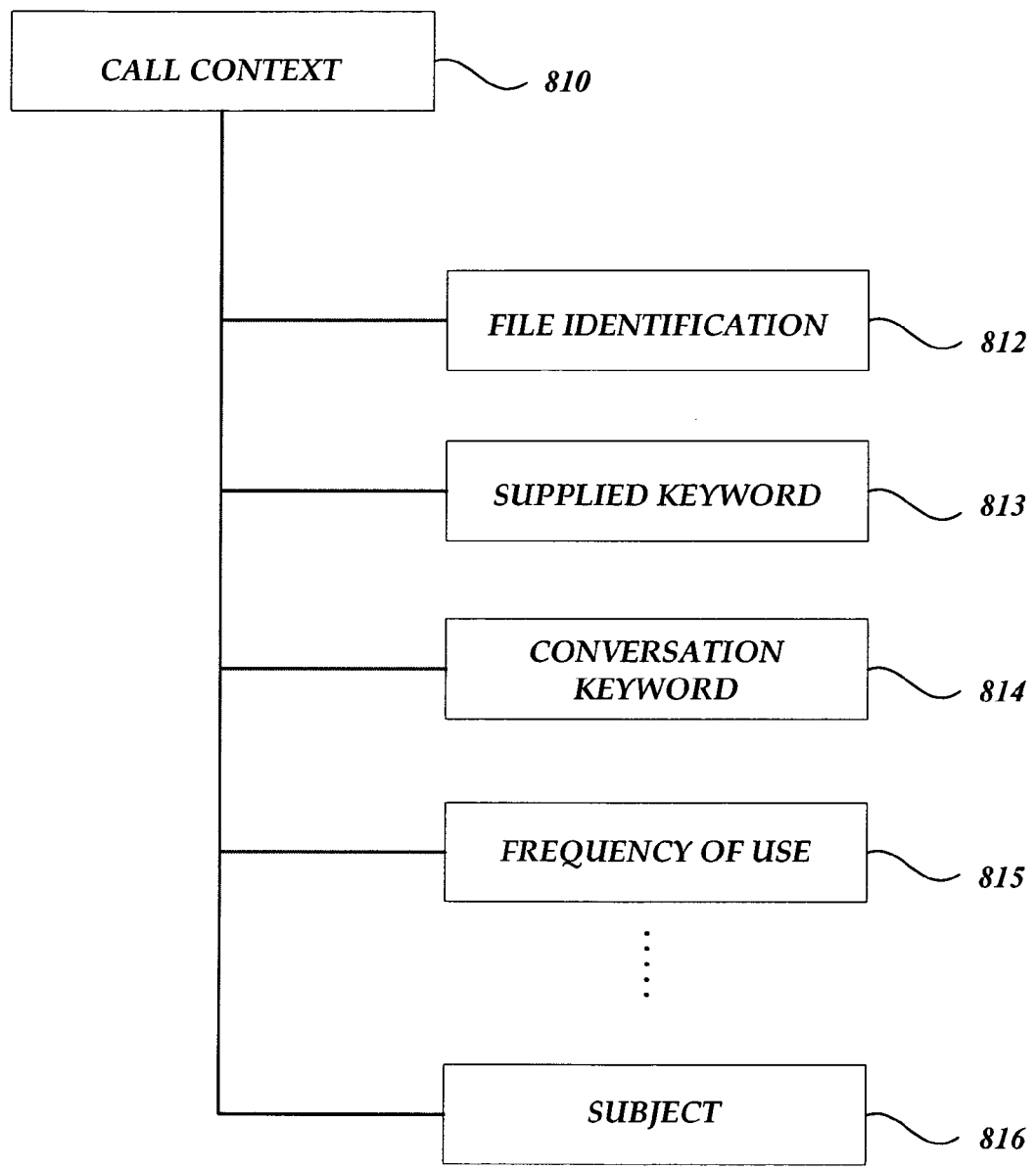

With reference to FIG. 8C, a block diagram of a call contexts class 810 is shown. In one embodiment, a subset of VoIP contextual information relating to conversation context may correspond to the call contexts class 810. The contextual information relating to conversation context may include: information such as keywords supplied from a client, a service provider, network, etc.; identified keywords from document file data; identified keywords from a conversation data packet (e.g., conversation keywords); file names for documents and/or multimedia files exchanged as part of the conversation; game related information (such as a game type, virtual proximity in a certain game); frequency of use (including frequency and duration of calls relating to a certain file, a certain subject, and a certain client); and file identification (such as a case number, a matter number, and the like relating to a conversation). The contextual information relating to conversation context may further include information relating to encryption (whether and/or how to encrypt contextual information) and subject of service (a type or nature of the service when a client requests such service from a service provider), among many others. In accordance with an illustrative embodiment, a call contexts class 810 may be defined as a subtree structure of a VoIP namespace 800 that includes nodes corresponding to file identification 812, supplied keyword 813, conversation keyword 814, frequency of use 815, encryption 816, service 820, and the like.

Figure 8D:
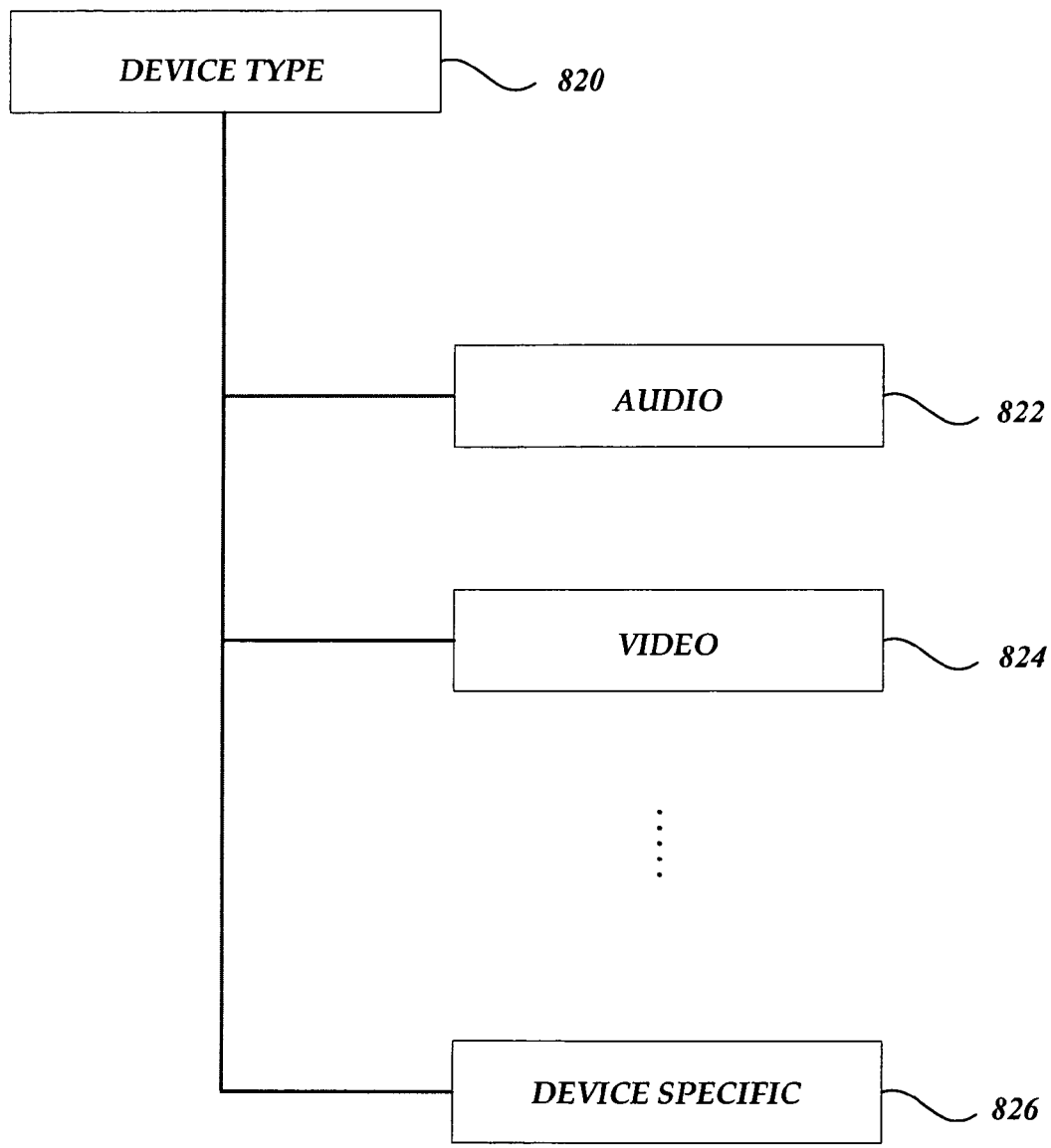

With reference to FIG. 8D, a block diagram of a device type class 830 is depicted. In one embodiment, a device type class 830 may correspond to a subset of VoIP contextual information relating to a VoIP client device used for the conversation channel connection. The subset of the VoIP contextual information relating to the VoIP client device may include audio related information that may be needed to process audio data generated by the VoIP client device. The audio related information may include information related to the device's audio functionality and capability, such as sampling rate, machine type, output/input type, microphone, digital signal processing (DSP) card information, and the like. The subset of the VoIP contextual information relating to the VoIP client-device may include video related information that may be needed to process video data generated by the VoIP client device. The video related information may include resolution, refresh, type, and size of the video data, graphic card information, and the like. The contextual information relating to VoIP client devices may further include other device specific information such as type of the computer system, processor information, network bandwidth, wireless/wired connection, portability of the computer system, processing settings of the computer system, and the like. In an illustrative embodiment, a device type class 830 may be defined as a subtree structure of a VoIP namespace 800, which includes nodes corresponding to audio 832, video 834, device specific 836, and the like.

Figure 8E:
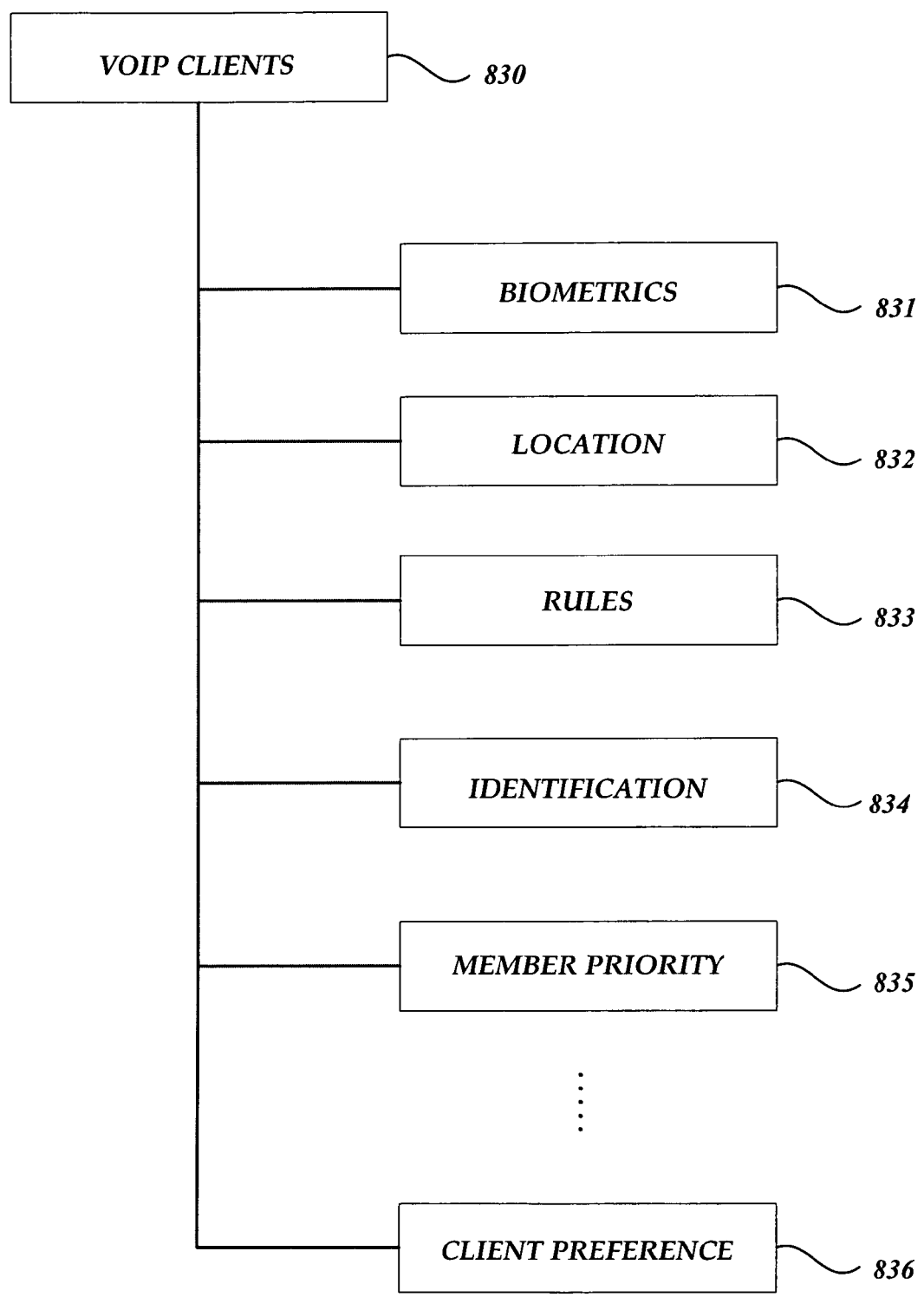

FIG. 8E depicts a block diagram of a VoIP client class 840. In accordance with an illustrative embodiment, a VoIP client class 840 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., a fingerprint) related to biometric authentication, user stress level, user mood, etc. The subset of the VoIP contextual information relating to the VoIP client may include assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. As will be described in greater detail below, the subset of the VoIP contextual information relating to the VoIP client may include inter-network information. In one embodiment, a VoIP client class 840 may be defined as a subtree structure of a VoIP namespace 800, which includes nodes corresponding to user biometrics 841, user preference 842, rules 843, user identification 844, member priority 845, location 846, network 850, and the like.

Figure 9:
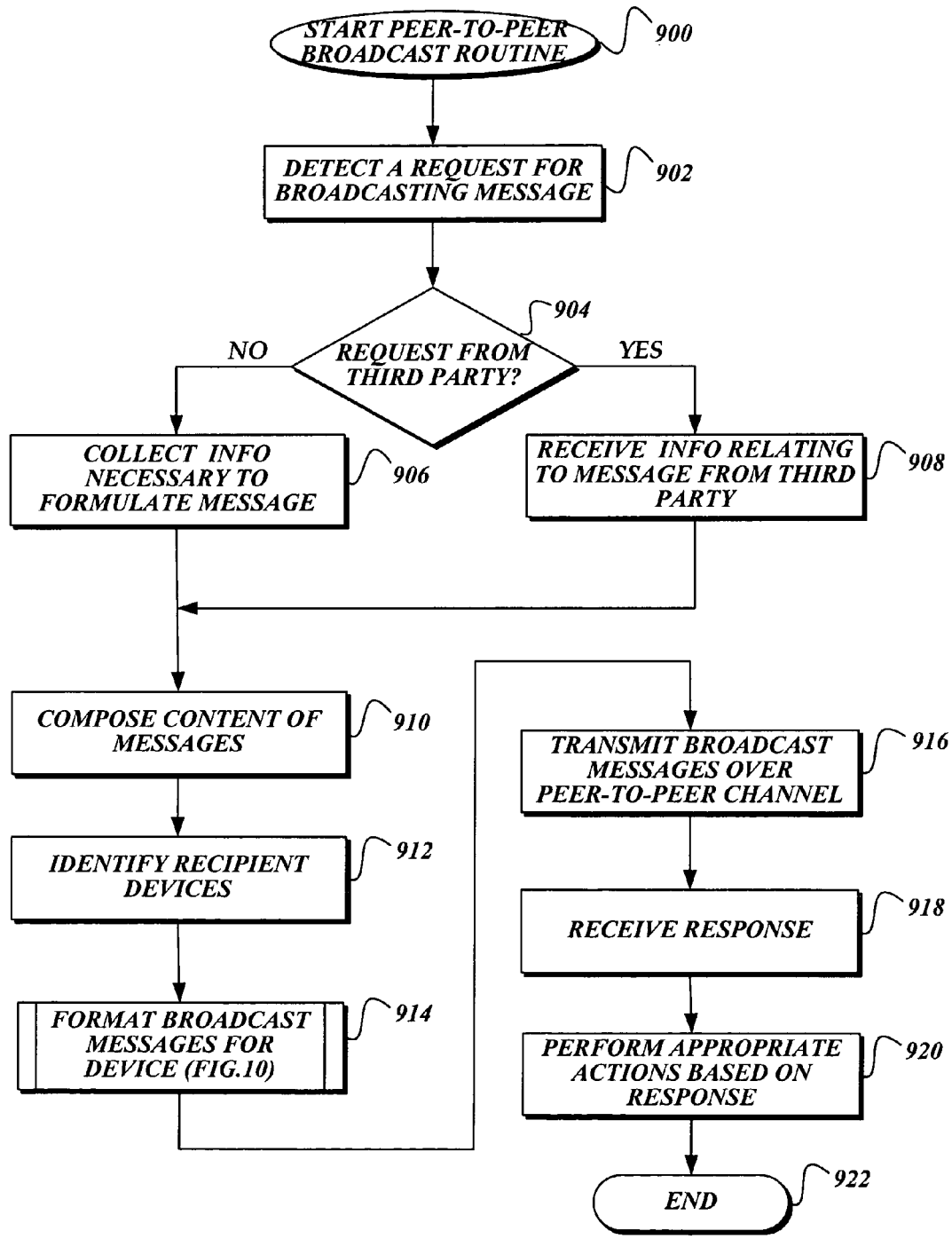
FIG. 9 is a flow diagram illustrating a routine for peer-to-peer broadcasting of a message in accordance with an aspect of the present invention.

FIG. 9 is a flowchart illustrating a routine 900 for peer-to-peer broadcasting of a message in accordance with an embodiment of the present invention. For the purpose of discussion, assume that a designated device of a VoIP client (broadcast device) has existing peer-to-peer communication channels with devices of other VoIP clients.

Beginning at block 902, the broadcast device may detect a request for broadcasting messages. The request for broadcasting messages can be triggered upon detection of certain events in the broadcast device. At decision block 904, a determination is made as to whether the request is from a third party (e.g., a service provider, authorized third party, other VoIP clients, etc.). If it is determined at decision block 904 that the request is triggered by some event in the broadcast device, at block 906, the broadcast device collects information necessary to formulate messages. In one embodiment, the broadcast device may have a predefined set of events which will trigger a message broadcast. For example, an individual user of the broadcast device may instruct the broadcast device to automatically broadcast any messages received within 12 hours to a specified group of clients. In one embodiment, the broadcast device may be configured to automatically broadcast any messages stored in local memory periodically.

If it is determined at decision block 904 that the request is from a third party, at block 908, the broadcast device receives information relating to a message from the third party (e.g., the message originator). In one embodiment, the information includes the content of the message, priority information, scheduling information, duration of the broadcast, escalating message information, etc. In an illustrative embodiment, each emergency broadcast organization may have different levels or sub-levels of priority based on a current emergency situation, an individual user's member ranking, or the like. Further, the broadcast device may obtain priority information from various sources. In one embodiment, the broadcast device may obtain its corresponding priority information from a centralized repository, such as a centralized database server which may be centrally managed by either public or private entities. In addition, the broadcast device may obtain priority information from its service provider.

After collecting information (block 906) or receiving information (block 908), the content of the message may be composed based on collected or received information, as illustrated at block 910. At block 912, at least one group of devices (recipient devices) may be identified to receive messages. For example, the broadcast device identifies a group of devices which are currently connected via peer-to-peer communication channels. At block 914, a broadcast message may be formulated for each device via a formatting message subroutine 1000. As will be discussed in greater detail below, in some cases, a broadcast message may be formulated for each device and/or each client based on the client profile information, such as capability and functionality of client devices, priority, etc. At block 916, the formulated broadcast messages may be transmitted over peer-to-peer communication channels. Based on the priority information, the formulated broadcast messages may be scheduled for an orderly transmission of messages to clients. For example, the broadcast device has composed the content of messages for three different groups. Assume a scenario where a department store wishes to propagate an advertisement of its summer sale to people who are located in a 10 mile radius of the department store. Typical service providers may filter spam messages or advertisement messages upon request of their clients. The department store may recruit a few customers to broadcast advertisement messages. The recruited customer may be able to push advertisement messages with no cost to other people who are connected according to a peer-to-peer communication protocol. The advertisement messages may be embedded in contextual information and transmitted as part of VoIP conversation (i.e., piggybacked over voice or media information). Upon receipt of the advertisement message, any recipient client may send a proper response to the broadcast device. For example, a proper response can be a simple confirmation of receipt of the advertisement message, a negative acknowledgment indicating a failure of delivery, a request to stop sending any more advertisement messages, etc. At block 920, the broadcast device may perform appropriate actions based on the received response. For example, if the response is a negative acknowledgment, indicating a failure of delivery, the advertisement message may be retransmitted. In some instances, the originator of the message may request to recall a specific message. The broadcast device may send a recall message to recipient devices and remove the message from its local memory. The routine 900 terminates at block 922.

It is to be understood that the embodiments explained in conjunction with the routine 900 are provided merely for example purposes. It is contemplated that the routine 900 can also be performed by a VoIP device acting as a hub for broadcasting. For example, a service provider can designate a VoIP device to propagate a message to other VoIP devices, to collect responses from other VoIP devices, and to provide the collected responses to the service provider. The designated VoIP device may receive a broadcast message with a request to propagate (relay) the message from an originator of the message which includes, but is not limited to, a service provider (e.g., an authorized call center) or other VoIP devices. The VoIP device may process the received broadcast message and determine an appropriate action. A user of the VoIP device may provide a proper input for propagating the messages. In some instances, a user of the VoIP device may reject the request to propagate.

In one embodiment, the VoIP device may propagate the message to recipient devices with a request to further propagate the message to other devices. Subsequently, the recipient devices may determine a group of VoIP devices which are currently connected and transmit the received message to the group of VoIP devices. An authorized recipient device may be allowed to change the contents of the message. Alternatively, each recipient device may just replicate the messages without processing or modifying the messages. Further, in order to prevent multiple copies of the same messages, each device may have the ability to detect repeated messages and reject them. Subsequently, the VoIP device may receive responses from the group of VoIP devices and forward the responses to the originator. For example, when the VoIP device receives a confirmation of receipt about the device broadcast message, the VoIP device forwards the received confirmation to the originator.

Figure 10:
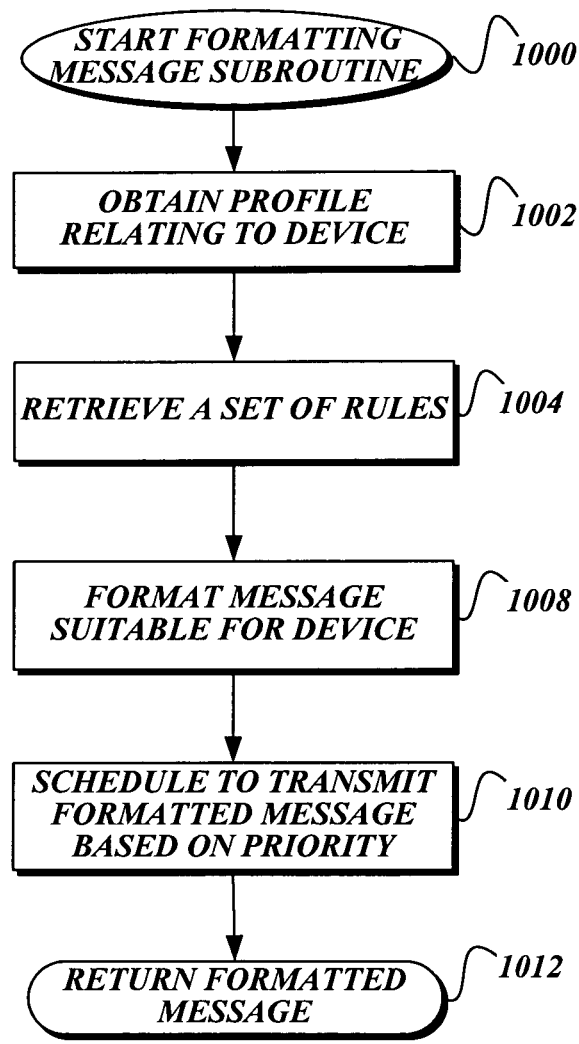
FIG. 10 is a flow diagram illustrating a subroutine for formatting a message utilized by the routine in FIG. 9.

FIG. 10 illustrates a block diagram of a subroutine 1000 for formatting and scheduling messages in accordance with an embodiment of the present invention. As described in FIG. 9, the broadcast device may have composed the content of a message and the information necessary to formulate the message may have been collected and/or obtained from a proper source.

Beginning at block 1002, profile information (device profile) relating to a recipient device may be obtained after at least one group of recipient devices has been identified and located. At block 1004, a set of rules specifying how to format the message may be retrieved or obtained. The set of rules may be predefined by an individual user of the broadcast device, or an originator of the message such as a service provider, other devices, or the like. Based on the set of rules, one or more messages may be formulated to be transmitted to a recipient device. For example, in an emergency message broadcast situation, a series of emergency messages may be formulated for a single recipient device. The series of emergency messages may be sent to recipient device until a confirmation of receipt from the recipient device is received. At block 1006, a broadcast message may be formatted suitable for each recipient device based on the set of rules and each device profile. Several recipient devices may belong to a single recipient client. For example, if a first device of a recipient client has limited functionality (e.g., only able to communicate simple text information), the message will be formulated accordingly. In some cases, the simple text information may not be enough to notify the recipient client about a certain event. In one embodiment, more detailed messages may be sent to a second device (e.g., other devices, or equipment, etc., which have capabilities and functionalities to process such messages) of the recipient client while simple text information including an instruction about the more detailed messages may be sent to the first device. Upon receipt of the simple text information, an individual user of the first device may access the second device to receive the detailed messages.

In an illustrative embodiment, based on the set of rules, an alternative path may be determined to deliver the message to a recipient device which is not currently connected. For example, the broadcast device may identify other devices which are connected with the recipient device and request to forward the message to the recipient device. In some cases, a recipient client may have designated a secondary contact person who is delegated to receive a message on behalf of the recipient client in an emergency situation. In that case, the broadcast device may identify a device of the secondary contact specified by the recipient client. After a message(s) is formatted for each recipient device, at block 1008, a schedule for the message(s) will be determined. In one embodiment, when the messages are formatted, the messages may be scheduled according to the set of rules. For example, a schedule to transmit formatted messages can be determined based on a priority of the client among its associated group, a priority of the message(s) for a client, etc. In one embodiment, the formatted messages may be queued in accordance with the schedule and be transmitted in an order within the queue. At block 1010, the formatting message subroutine 1000 returns the formatted messages and then terminates.

Figure 11:
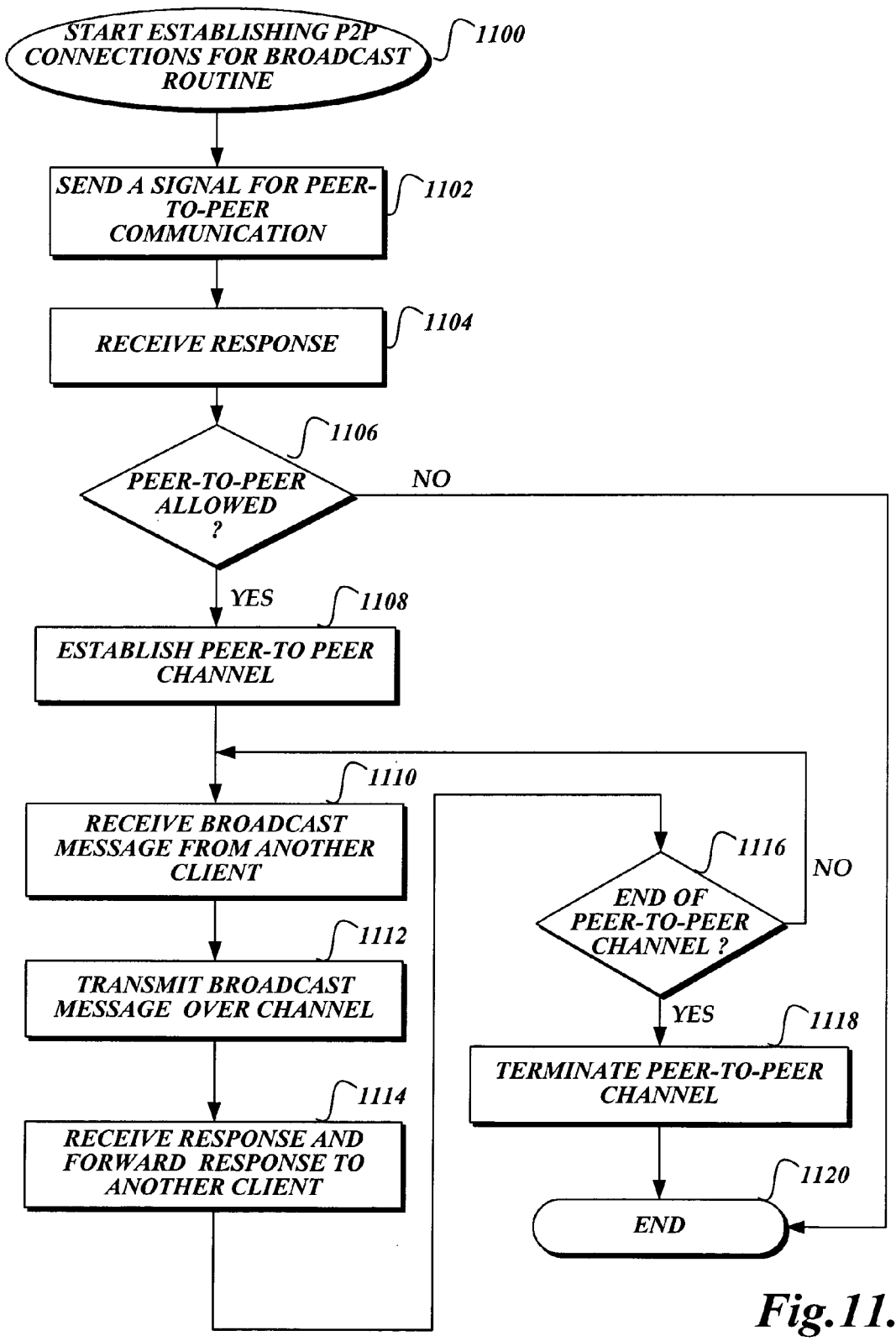
FIG. 11 is a flow diagram illustrating a routine for establishing peer-to-peer connections for a message broadcast in accordance with an embodiment of the present invention.

FIG. 11 illustrates a block diagram of a routine 1100 for establishing peer-to-peer connections for a message broadcast in accordance with an embodiment of the present invention. As described in FIG. 9, the broadcast device may allow a third party client to broadcast a message using its existing communication channel. Further, when there is no peer-to-peer channel connection, the broadcast device may establish a peer-to-peer channel connection in order to broadcast a message to the identified group of clients.

For the purpose of discussion, assume a scenario where a department store wishes to propagate a series of advertisement messages about the summer sale to attract many people in town. Bob, a loyal customer of the department store, has been recruited to broadcast advertisement messages upon receipt of a request from the department store. While Bob is shopping at the department store, Bob receives a message from the department store which promises a big reward for Bob if more than 10 people get the summer sale advertisement messages being transmitted from the department store within next two hours. Although Bob is not currently communicating with anyone, Bob can establish a communication channel with his friends and push the advertisement messages to those friends. The advertisement messages may be embedded in contextual information and transmitted as part of VoIP conversation (i.e., piggybacked over voice or media information).

Beginning at block 1102, the broadcast device may send a signal to initiate a peer-to-peer communication channel connection with a recipient device. At block 1104, the broadcast device may receive a response to the signal from the recipient device. At decision block 1106, a determination is made whether a peer-to-peer communication channel connection is allowed with the recipient device. In one embodiment, the recipient device may have a predefined set of rules specifying that the recipient does not accept any peer-to-peer communication channel connection. Based on the set of rules, the recipient device may refuse to have a peer-to-peer communication channel connection established. In another embodiment, the recipient device may be allowed to accept the signal to establish a peer-to-peer communication channel connection. If it is determined at decision block 1106 that a peer-to-peer communication channel connection is allowed, at block 1108, a peer-to-peer communication channel is established with the recipient device. Individual users of the devices (the broadcast device and the recipient device) may start exchanging a digital voice conversation over the peer-to-peer communication channel. However, it is contemplated that the peer-to-peer communication channel may be used merely to broadcast a message without having a bottleneck, which generally is a problem in a centralized broadcasting system. The message may be transmitted over part of a digital voice conversation (i.e., contextual information of the digital voice conversation).

While the devices are connected over a peer-to-peer communication channel, a third party may be allowed to send a broadcast message to the broadcast device at block 1110. Returning to the department example, while Bob is connected to his friend Steve via a peer-to-peer communication channel, the department store sends a shoe sale advertisement message to Bob's device. Bob may transmit the shoe sale advertisement message to Steve. At block 1112, the broadcast device may transmit the received message over the existing the peer-to-peer communication channel. In one embodiment, the broadcast device may modify the received message by adding, deleting, or updating some information before transmitting the message. In another embodiment, the broadcast device may merely forward the received message to the recipient device. In the department store example, the department store may authorize Bob to modify the advertisement message. In this example, Bob may modify the advertisement message to be more appropriate for Steve. For example, Bob may add a text message indicating that Steve's favorite shoes brand is on a 50% off sale and that he should be hurry to get to the department store. Further, Bob may remove a video clip from the message due to the functional limitations of Steve's receiving device or a personal preference of Steve.

At block 1114, the broadcast device may receive a response to the message from the recipient device. As discussed above, the response can be a confirmation of receipt, a failure of delivery, a request for some action, etc. In some instances, the response may be forwarded back to the third party. In this manner, the third party and the recipient device can exchange information via the broadcast device. At decision block 1116, a determination is made as to whether any of the devices has requested to end the peer-to-peer communication channel. If the peer-to-peer communication channel is to be continued, the routine 1100 proceeds to block 1110 and repeats the above-mentioned steps until any of the devices requests to end the peer-to-peer communication channel. If it is determined at decision block 1116 that the peer-to-peer communication channel is requested to be ended, at block 1118, the peer-to-peer communication channel connection is terminated. If it is determined at decision block 1106 that a peer-to-peer communication is not allowed with the recipient device, or after the peer-to-peer communication is terminated (block 1118), the routine completes at block 1120.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for broadcasting a message from a device to recipient devices over a digital voice communication channel, comprising:

composing a content of a broadcast message;

identifying a first group of recipient devices based on the content, the recipient devices being communicatively connected according to a peer-to-peer protocol that is used to transmit messages as part of a Voice Over Internet Protocol (VoIP) conversation; wherein at least a portion of the recipient devices are connected through a communication channel that is used to transmit and receive contextual data packets and conversational data packets between the at least the portion of the recipient devices; wherein the conversational data packets are for conversation data and the contextual data packets are for data other then the conversation data;

formatting at least one broadcast message in accordance with profile information of a recipient device from the first group;

transmitting the formatted broadcast message to a recipient device from the first group; in response to receiving the broadcast message, the recipient device, automatically sends the broadcast message to another recipient devices from the first group connected according to the peer-to-peer protocol; and receiving a response to the transmitted broadcast message from the recipient device.

2. The method of claim 1 further comprising:

identifying and locating a second group of recipient devices which have indicated a peer to peer communication channel is permitted, the second group of recipient devices not yet being connected according to a peer-to-peer protocol;

establishing a peer to peer communication channel with a recipient device from the second group;

formatting at least one broadcast message in accordance with profile information of the recipient device from the second group; and transmitting the formatted broadcast message to the recipient device from the second group over the established peer to peer communication channel.

3. The method of claim 2, wherein the second group of recipient devices is identified based on geographic locations of each recipient device.

4. The method of claim 3, wherein the second group of recipient devices is identified based on a predefined set of rules.

5. The method of claim 1, further comprising:

if the response from the recipient device indicates a failed delivery of the broadcast message, retransmitting the broadcast message to the recipient device.

6. The method of claim 1 further comprising:

if the response from the recipient device indicates a successful delivery of the broadcast message, determining a next broadcast message and transmitting the next broadcast message to the recipient device.

7. The method of claim 1, wherein composing the content of a broadcast message includes receiving a request from an authorized party to broadcast a message in conjunction with broadcast information relating to the message, processing the request, and determining content for the broadcast message based on the processed request.

8. The method of claim 7, wherein the broadcast information includes information necessary to format, schedule, and/or transmit the message.

9. The method of claim 1 further comprising:

obtaining the profile information about the recipient device.

10. The method of claim 9, further comprising:
if the response from the recipient device is a request to stop the broadcast message, updating the profile information about the recipient client accordingly.

11. The method of claim 9 wherein if the profile information about the recipient device is not available, default profile information is utilized, and wherein the default profile information is predefined.

12. The method of claim 1, wherein composing the content of a broadcast message includes retrieving a request to broadcast a message, processing the request, and determining the content based on the processed request.

13. A method for permitting a sending device to transmit a message over an existing peer to peer communication channel without interrupting a digital voice conversation, comprising:
establishing a Voice Over Internet Protocol (VoIP) conversation channel between the sending device and a receiving device, wherein the VoIP conversation channel is used to transmit and receive contextual data packets and conversational data packets; wherein the conversational data packets are for conversation data and the contextual data packets are for data other than the conversation data;
receiving a message from the sending device over the established conversation channel;
upon receipt of the message, the receiving device,
identifying a set of contextual information corresponding to the message, embedding the message in the set of contextual information, and determining another recipients devices of the message based on the processed message; and
automatically transmitting the set of contextual information to the another recipients devices over an established peer-to-peer communication channel without interrupting the digital voice conversation.

14. The method of claim 13 further comprising:
receiving a response from the destination;
determining an appropriate action based on the response; and
performing the determined appropriate action.

15. The method of claim 14, wherein performing the determined appropriate action includes forwarding the response to the sending device.

16. The method of claim 13 further comprising:
upon receipt of the message, forwarding the message to the destination without processing the message.

17. A system for broadcasting a message over a digital voice conversation between two or more devices in a peer-to-peer network, comprising:
a processing component for detecting a request to broadcast;
a generating component for identifying a recipient device upon detecting the request to broadcast and for formatting a first broadcast message suitable for the recipient device; and
a broadcasting component for transmitting the first broadcast message to the recipient device; in response to receiving the broadcast message, sends the broadcast message to another recipients devices over a digital voice conversation according to a peer-to-peer protocol that is used to transmit messages as part of the digital voice conversation without interrupting the digital voice conversation; wherein the digital voice conversation occurs over a communication channel that is used to transmit and receive contextual data packets and conversational data packets; wherein the conversational data packets are for conversation data and the contextual data packets are for data other then the conversation data.

18. The system of claim 17, wherein the broadcasting component receives a response from the recipient devices about the first broadcast message and based on the response, the processing component performs an appropriate action.

19. The system of claim 17, wherein the request to broadcast is triggered by an authorized party.

20. The system of claim 17, wherein the request to broadcast is triggered by a predefined event.

* * * * *